United States Patent [19]
Calder

[11] Patent Number: 5,949,417
[45] Date of Patent: Sep. 7, 1999

[54] DYNAMIC PROPERTY SHEET SYSTEM

[75] Inventor: Dale E. Calder, Mansfield, Mass.

[73] Assignee: The Foxboro Company, Foxboro, Mass.

[21] Appl. No.: 08/792,971

[22] Filed: Jan. 31, 1997

Related U.S. Application Data

[60] Provisional application No. 60/019,782, Jun. 14, 1996.

[51] Int. Cl.[6] .................................................. G06F 3/00
[52] U.S. Cl. .............................................................. 345/342
[58] Field of Search ...................................... 345/326–358

[56] References Cited

U.S. PATENT DOCUMENTS

| | | | |
|---|---|---|---|
| 4,899,136 | 2/1990 | Beard et al. | 345/349 |
| 5,060,135 | 10/1991 | Levine et al. | 345/349 |
| 5,140,678 | 8/1992 | Torres | 345/342 |
| 5,283,864 | 2/1994 | Knowlton | 345/350 |
| 5,546,528 | 8/1996 | Johnston | 345/342 |
| 5,664,127 | 9/1997 | Anderson et al. | 345/350 X |
| 5,668,964 | 9/1997 | Helsel et al. | 345/350 |
| 5,682,510 | 10/1997 | Zimmerman et al. | 345/352 |

OTHER PUBLICATIONS

Mike Blaszczak, "User Interface Issues", *The Revolutionary Guide to MFC Programming with Visual C++*, WROX Press Ltd. 8 pages (1996).
Microsoft Developer Network—Library—Apr. 1996 CD Rom, "Property Sheets", *Programming for the Windows 95 User Interface—MSDN Library,* pp. 1–2.
Microsoft Developer Network—Library—Apr. 1996 CD Rom, "Tabs", *Programming for the Window 95 User Interface—MSDN Library,* pp. 1–2.
Microsoft Developer Network—Library—Apr. 1996 CD Rom, "Win32 Common Controls, Part 6: Tab Controls and Property Sheets", *Technical Articles; Windows: User Interface: User Interface: Controls—MSDN Library,* pp. 1–27.
Microsoft Professional Reference, Microsoft Press, *The Windows® Interface Guidelines for Software Design,* Chapter 7—Menus, Controls,and Toolbars, p. 166 (1995).
Microsoft Professional Reference, Microsoft Press, *The Windows® Interface Guidelines for Software Design,* Chapter 11—Working with OLE Embedded and OLE Linked Objects,, pp. 321–324 (1995).
Microsoft Professional Reference, Microsoft Press, *The Windows® Interface Guidelines for Software Design,* Chapter 8—Secondary Windows, pp. 179–215 (1995.

*Primary Examiner*—John E. Breene
*Attorney, Agent, or Firm*—Lahive & Cockfield, LLP

[57] ABSTRACT

Methods and apparatus for the concurrent display of two or more property pages of a Graphical User Interface (GUI) are disclosed. A user can select a property page displayed by a first property sheet system and create a second property sheet system that displays the selected property page at second, user selected display position. Alternatively, the user can place, or dock, the selected property page into an existing property sheet system for inclusion therein and display thereby. The first property sheet system displays, at a first display position, any of the property pages remaining therein. Typically, the selected property page is removed from the first property sheet system and the first property sheet system is destroyed if it contains no other property pages. The invention allows a user of a GUI to concurrently display and interact with multiple property pages of multiple property sheet systems for optimizing the exchange of information with the GUI.

33 Claims, 7 Drawing Sheets

DYNAMIC PROPERTY SHEET SYSTEM

This application claims priority under 35 U.S.C. 119(e) to co-pending U.S. provisional application Ser. No. 60/019,782, filed Jun. 14, 1996 now pending, the contents of which are hereby incorporated by reference.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to graphical user interfaces, and particularly to property sheet systems having property pages viewable on a graphical user interface.

BACKGROUND

A graphical user interface (GUI) is an indispensable feature of most modem computer systems. A Gul allows a user to interact intuitively with an application program running on the computer by allowing the user to manipulate pictorial representations of objects. Many of the display components of a typical GUI, such as title bars, menu bars, icons, multiple windows, scroll bars, pop up menus and dialog boxes, are now standard features. A modem GUI represents a major improvement over the text-based entry systems of just a few years ago.

Typical dialog boxes of a GUI system allow a user to exchange information with an application program. Some dialog boxes simply require a user to confirm an operation before it is executed by the computer; other dialog boxes may ask for user selected input, such as choice of a disk drive, directory, file name, file type, network path, etc. Dialog boxes typically comprise components such as text boxes, list boxes, option buttons, and command buttons.

If a large amount of related information is to be exchanged between a user and the computer a GUI may include a special type of dialog box known as a property sheet system. A property sheet system, for example, can have a display that includes several tabs which represent different dialog boxes, known as a property pages. The user can select a tab to display the particular property page associated with that tab. Once selected, the user can enter information, confirm an operation, or make other appropriate option choices.

Available property sheet systems can be frustrating to use. For example, to configure optimally an application program, a user often exchanges information with the program by using several modeless property pages. Often the configuration options that result in the desired performance of the application are not immediately obvious and are arrived at by some trial and error. Unfortunately, because the property sheet system displays only one property page at a time on a monitor, a user usually selects appropriate tabs to switch between multiple property pages, e.g. property pages are relegated to the background. Furthermore, the user is typically required to remember the particular settings on the nondisplayed property pages. This procedure of continually switching between property pages to configure a system is overly laborious and time consuming.

Accordingly, an object of the invention is to provide a property sheet system that allows a user to easily and efficiently exchange information with an application program.

A further object of the invention is to provide a property sheet system that reduces the need of a user to choose continually between displayed and nondisplayed property pages when the exchange of information requires the use of more than one property page.

Other general and specific objects of the present invention will be apparent and evident from the accompanying drawings and the following description.

SUMMARY OF THE INVENTION

The present invention relates to, broadly, the creation of a second property sheet system from a first property sheet system. The first property sheet system includes one or more property pages, which are displayable on a display monitor at a first display position. The first property sheet system is often part of an existing application program. For example, a word processor program on which this application is being typed has a property sheet system for setting up printers. This property sheet system includes "tabbed" property pages entitled "setup", "paper", "destination", "print quality", and "fonts". According to the invention, a property page is selected is response to an input signal from a user-operated pointing and selecting device, such as a mouse. In response to a second signal generated by the user, typically via the mouse, the selected property page is included in, and displayed by, a second property sheet system. The user may thus display and interact with two property pages simultaneously: the selected property page, which is displayed by the second property sheet system, and any one of the property pages remaining in the first property sheet system, which is displayed by the first property sheet system.

One technique by which a user may select a property sheet is by "tearing," that is, selecting a tab representing a property page of the first property sheet system. The property page "torn" or selected from the first property sheet system is displayed at a second location, determined by the user, on the display screen. Typically, a user employs "drag and drop" operation to select a property page, create a second property sheet system, and to display the torn property page at a user-selected display location.

As noted, creating more than one property sheet system allows a user to view and exchange data with an application program using two or more property pages that are viewed simultaneously. The user need not continually switch between displayed and non displayed property pages, nor need he or she commit to memory the contents of one or more property pages. Note that as used herein, the term property page or sheet is intended to include a modal or modeless secondary window that displays user-accessible properties of an object. A property page is said to be included in a property sheet system and can be displayed in a variety of formats to best allow a user to exchange information with a computer or with an application program running on a computer.

Additionally, property pages can be exchanged between property sheet systems, whether these systems are created according to the invention or exist as part of a separate application program, such as a word processor program. A property page "torn" from a property sheet system is typically displayed as a geometric object or other symbol during the "drag" portion of the "drag and drop" operation. A user can place the selected, or "torn," property page in an existing property sheet system for inclusion therein and display thereby, rather than in a new property sheet system created to include the selected page. Typically, the user places the symbol representing the "torn" page in close proximity to a property page displayed by the property sheet system into which it is desired to drop the "torn" page. A docking input signal, such as release of a mouse button, causes the selected property page to "drop", or "dock" into the chosen property sheet system. Once docked in the chosen system, the property page may be used by the user just as when it was in the previous property sheet system.

According to one aspect, the invention includes a processor; a memory element; a display monitor; a user input device; a selection element for selecting a property page of a first property sheet system responsive to a signal generated by a user input device, such as, for example, mouse, trackball, or keyboard; and a second program element for creating a second property sheet system for including the selected property page and for displaying the selected property page at a second display position on the display monitor.

According to another aspect, the invention includes a removal element for removing from the first property sheet system the property page selected by the selection element such that the selected property page is not displayable by the first property sheet system.

In yet another aspect, the invention includes a destruction element for destroying a property sheet system when system does not include any property pages, such as when the last page in the system has been removed by the removal element.

According to another aspect of the invention the invention further includes a docking element, for, in response to a signal generated by a typical user input device, placing a property page selected by the selection means into a selected property sheet system for inclusion therein and display thereby.

In yet another aspect, the invention incorporates a positioning program element, responsive to input signal generated by the user input device, for selecting the second display position at which the second property sheet system displays property sheets included therein.

In a different variation, the positioning element varies the display position of a symbol in response to a user input. The second program element, responsive to the user input, displays the selected property page at the second position. The positioning element also allows for placing the symbol in substantial registration with a displayed property page of a property sheet system such that the docking element, responsive to a user input signal, such as release of a mouse button, places the selected property page into the property sheet system with which the symbol was in substantial registration. The symbol can be the dotted outline of a box, and the box can be the approximate size of a displayed property page.

To aid the user in docking a selected property page into an existing property sheet system, the invention can include an element for displaying on the display monitor an icon having a second display state for indicating to a user when the symbol or geometric object is in substantial registration with a property page of a property sheet system. For example, the icon second display state can comprise a display of a two puzzle pieces that are mated, and the icon can have a first display state comprising two puzzle pieces that are not mated, for indicating a when a symbol or geometric figure is not properly registered, i.e., the selected property page will not be docked by the docking means into an existing property sheet system.

According to another feature of the invention, in addition to a positioning element responsive to user input for varying a position of symbol displayed on the display monitor, a a proximity program element is included. The proximity element determines a parameter responsive to the distance on the display monitor between the symbol and the position on the display monitor of a displayed property page of a property sheet system. When the parameter is less than a first amount, the docking means, responsive to a first user input signal generated by the user input device, places the property page selected by the selection element into the property sheet system for inclusion therein and display thereby. When the parameter varies from the selected value by a second selected amount, the second program means, responsive to a second input signal, places the property page in a newly created property sheet system and displays the selected property page at a position on the display monitor substantially determined by the display position of the symbol. For example, the displayed property page can be centered about the position of the symbol. The first and second input signals can be responsive to the release of a mouse button as part of the "drag and drop" procedure.

Of course, the invention pertains not only to a computer programmed in the manner described above to perform the transformation and operations described above, but to a machine readable data storage medium including the above-described elements. The invention is also understood to comprise methods for performing the above operations.

It will thus be seen that certain changes may be made in the above constructions without departing from the scope of the invention. It is intended that all matter contained in the above and following description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

BRIEF DESCRIPTION OF THE DRAWINGS

The foregoing and other objects, features and aspects of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

The removing or tearing of property pages from a property sheet system, in accordance with the teachings of the present invention, extends the user interface of standard Windows/Windows 95/Windows NT property pages to enable a user to change values on separate property pages simultaneously without changing visual context. The user can grab the active property page and pull/tear it away from the property sheet system and place it in an existing or newly created property sheet system. However, one of ordinary skill in the art, in accordance with the teachings herein, understands the invention to be applicable to GUI's in other operating environments, such as, for example, X-Windows, Motif, and IBM OS/2.

Figure 1:
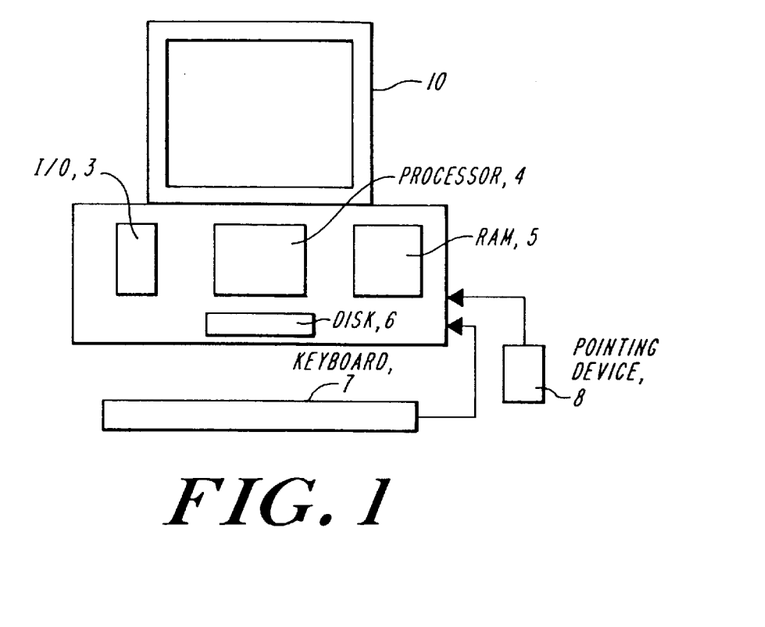
FIG. 1 illustrates a typical computer system according to the invention.

The practice of the invention includes a computer, such as the computer 2 illustrated in FIG. 1. The computer 2 typically includes input-output hardware 3, a central processor 4, random access memory 5, disk storage 6, a keyboard 7, pointing device, such as a mouse 8 and a display monitor 10. The Input/output hardware 4 connects the computer 2 to, for example, a network.

Figure 2:
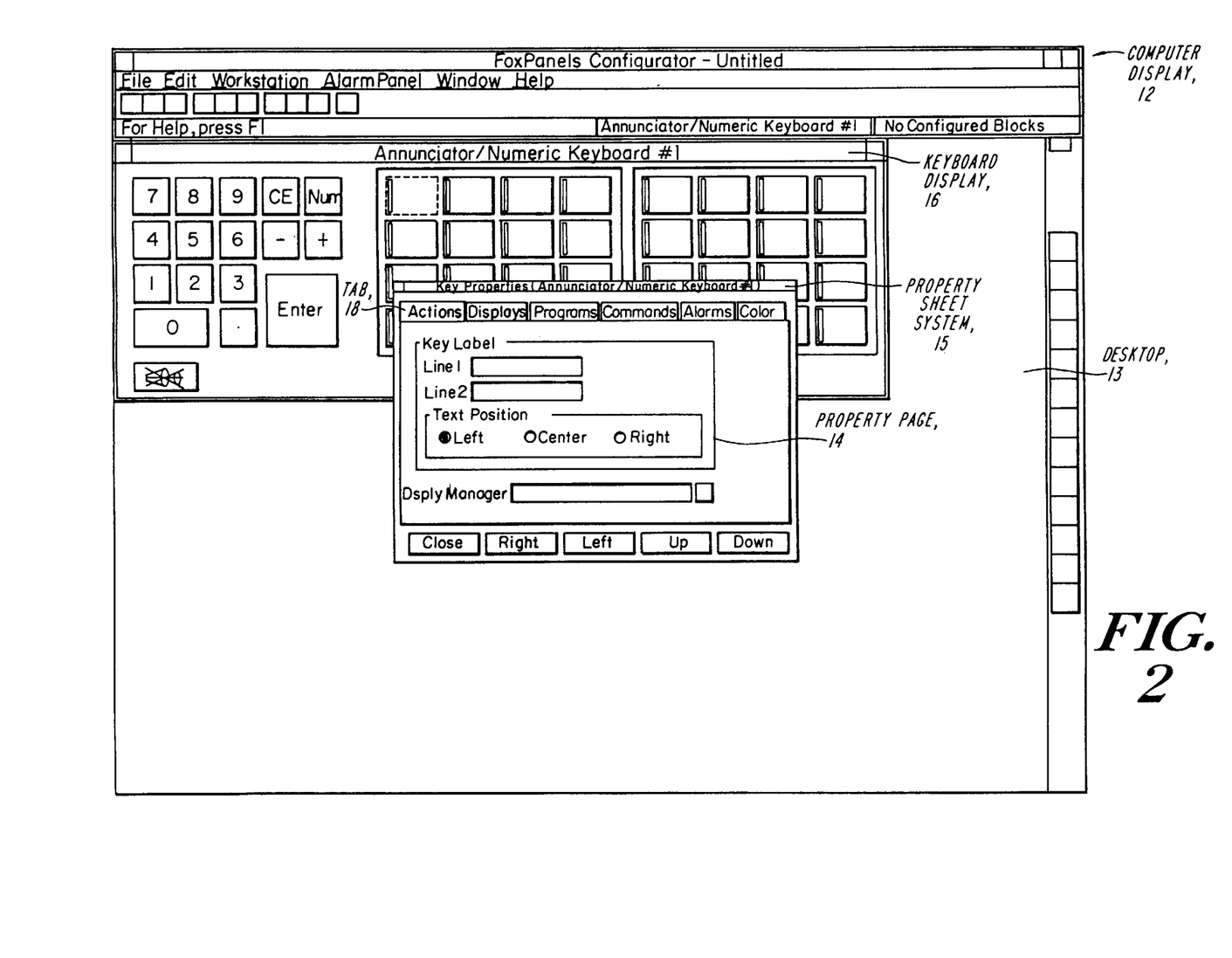
FIG. 2 illustrates a typical property page of a property sheet system for configuring, for example, the keyboard display of an application program. A user accesses each property page of the property sheet system by selecting the appropriate tab displayed at the top of the property page window display.

FIG. 2 illustrates a typical computer display screen display 12 of a property page 14 of a property sheet system. The property page 14 in FIG. 2 is used for configuring the keyboard display 16 of an application program that monitors and controls industrial processes. One such industrial process control system is the I/A SERIES® System available from The Foxboro Company, of Foxboro, Mass., USA. However, an industrial process monitoring system is merely one example of the type of environment in which property pages are typically very useful; the present invention is useful in many computer application programs, such as word processors, spreadsheets, communications packages, web browsers, etc. However, in the particular embodiment illustrated here, the property pages are used to configure a keypad annunciator of an industrial process control system, such as the keypad annunciator 16 in FIG. 2. Many of the keys of a keypad annunciator 16 are configurable, via property pages, such that a given individual key is associated with a particular alarm state of the industrial process control system; occurrence of that alarm state causes the key to change appearance. The key is also configurable such that selecting the key with the mouse can initiate selected corrective action or display a selected process graphic.

Figure 3:
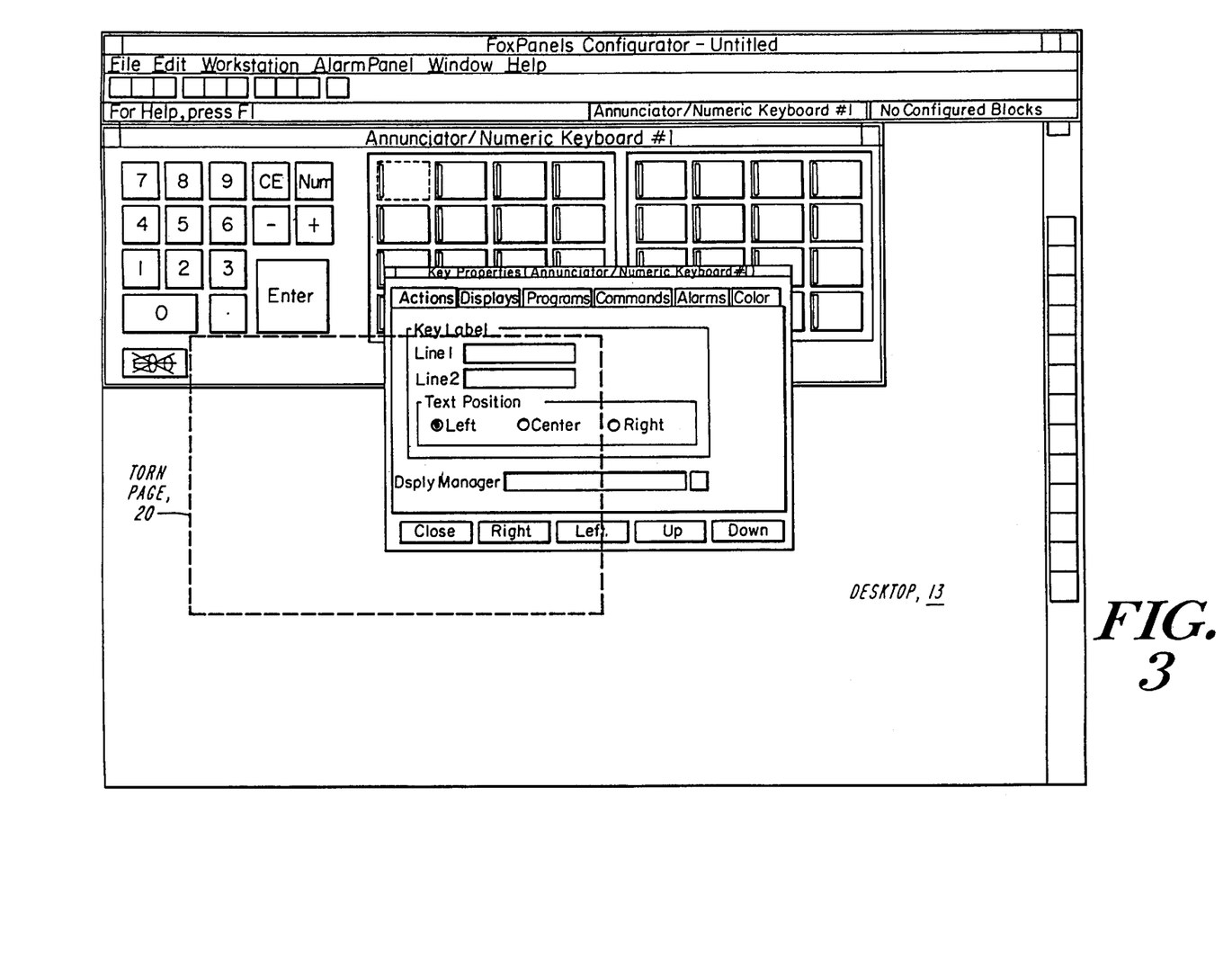
FIG. 3 illustrates an intermediate display presented as part of the "drag and drop" procedure for creating a new property sheet system including a property page "torn" from the first property sheet system of FIG. 2.
Figure 4:
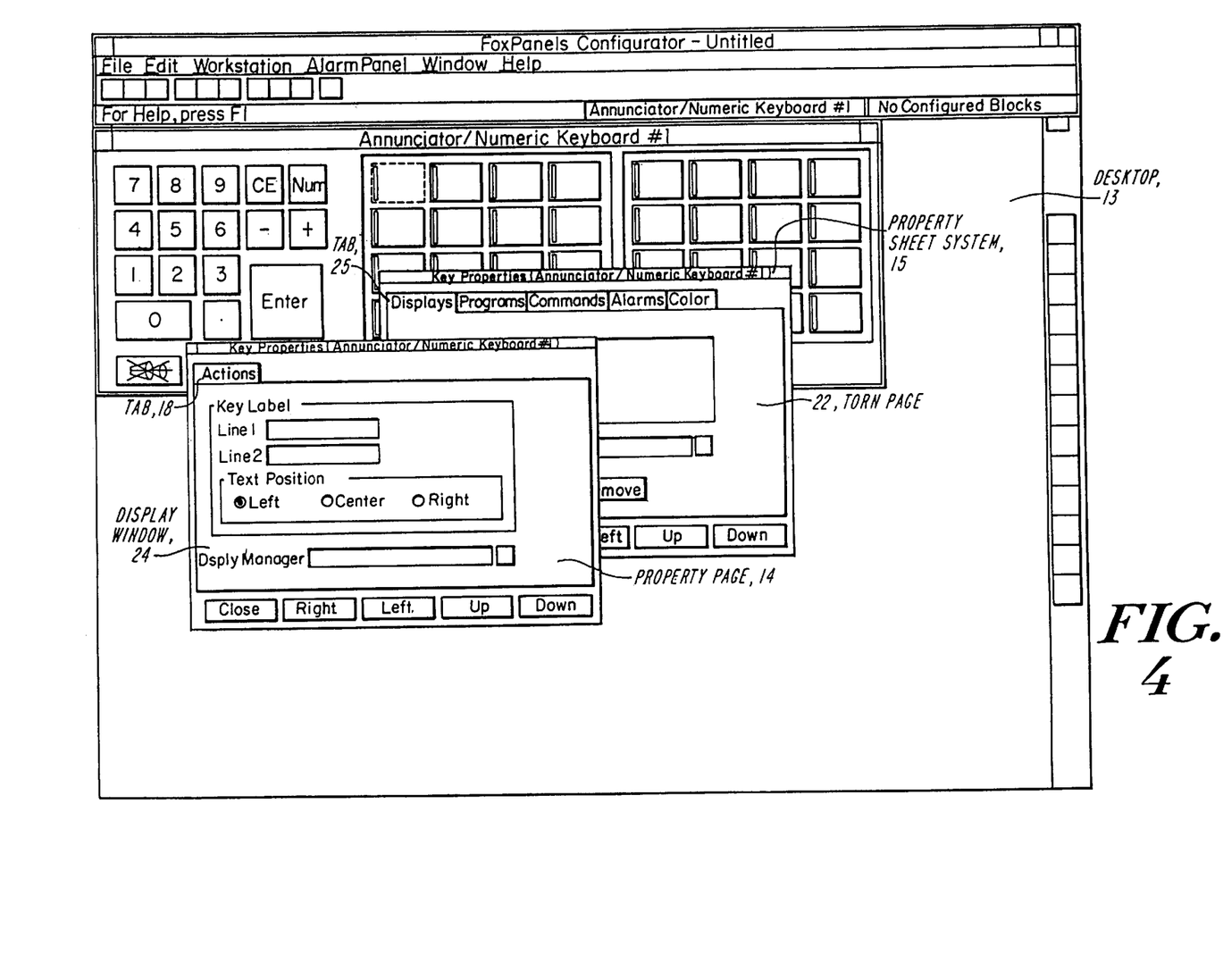
FIG. 4 illustrates a second property sheet system including the property page "torn" from the first property sheet system illustrated in FIG. 2 and which is displayed simultaneously therewith.

To "tear" a page from a property sheet system, the user positions a cursor over the body (i.e., generally anywhere other than an edit field or the tab representing the property page 14) of property page 14 and provides an input signal, typically by depressing a button on the mouse. During this tearing, or selection, process the user is presented with an outline of the property page while the mouse is pressed, and the outline can be positioned by "dragging" it anywhere on the display screen. FIG. 3 illustrates the outline 20 of property page 14 that is in the process of being torn from its property sheet system. Once the desired position is found, releasing the mouse button signals the application to create a new property sheet dialog system and populate it with the torn-away property page. Typically, the original property page 14 is removed from its original container, e.g., the first property sheet system, and is only available in the second property sheet system. The user can view and change values using different property pages in one visual context, that is, to view them simultaneously positioned above the desktop 13. FIG. 4 illustrates the simultaneous display of two property pages, the torn page 22, displayed in the display window 24 of the newly created property sheet system, and property page 14, now displayed in the original property sheet system display window 15, and corresponding to the tab 25 labeled "displays." The tab 18 labeled "actions" in FIG. 2 is removed from property sheet display window 15 and now appears in display window 24 in the newly created property sheet system, as illustrated in FIG. 4. The property page 14 and the property page 22 are now displayed concurrently, and the user can exchange data with either of them. Typically, as the user interacts with one of the displayed property pages, the other is updated, as necessary, to reflect the data exchange with the other. For example, if the display window 24 of the newly created property sheet system is active, that is, the user is exchanging data with the property page 14, the property page 22, displayed in the non-active window 15 of the original property sheet system, is updated, as necessary, to reflect the any data input by the user to the property page 14 displayed in window 24.

In addition to being able to create a new property sheet system for displaying the selected property page, the user can place the selected property page into an existing property sheet system. The user attaches, or docks, a "torn" property page into an existing property sheet system by dragging the outline 20 over the top of a property page displayed by that system. Releasing the mouse button when the outline is so positioned docks the property page into the property sheet system. As discussed immediately above, a displayed property page in a non active window is updated, as necessary, to reflect any input by a user to a displayed property page in an active window. Using the docking procedure, the property page 14 in FIG. 4 can be selected and placed back into in the original property sheet system for re-display in display window 15.

Figure 5A:
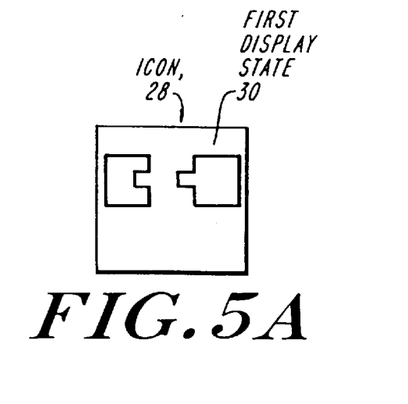
FIGS. 5A and 5B depict the selected display states of a dynamic icon for aiding a user in "docking" a property page removed from one of the property systems for placement within another sheet system.
Figure 5B:
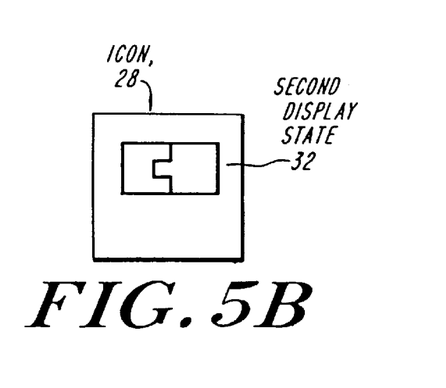

A visual cue, such as a dynamic icon 28 in FIGS. 5A and 5B, is provided to assist in the tear-away/docking operation. During the dragging process, the user is provided with a symbol such as dynamic icon 28 that shows two puzzle pieces. When the drag box is over a dock-site, i.e., over an existing property sheet system that can accept the property page being dragged, the puzzle pieces join and appear as a second display state 32, thus signifying to the user that the dragged page can be docked e.g., accepted, into the that system. FIG. 5A illustrates the dynamic icon in the first display state 30 wherein the puzzle pieces are separated, indicating that the drag box or geometric shape 20 is not properly positioned for a property page to be docked.

Figure 6:
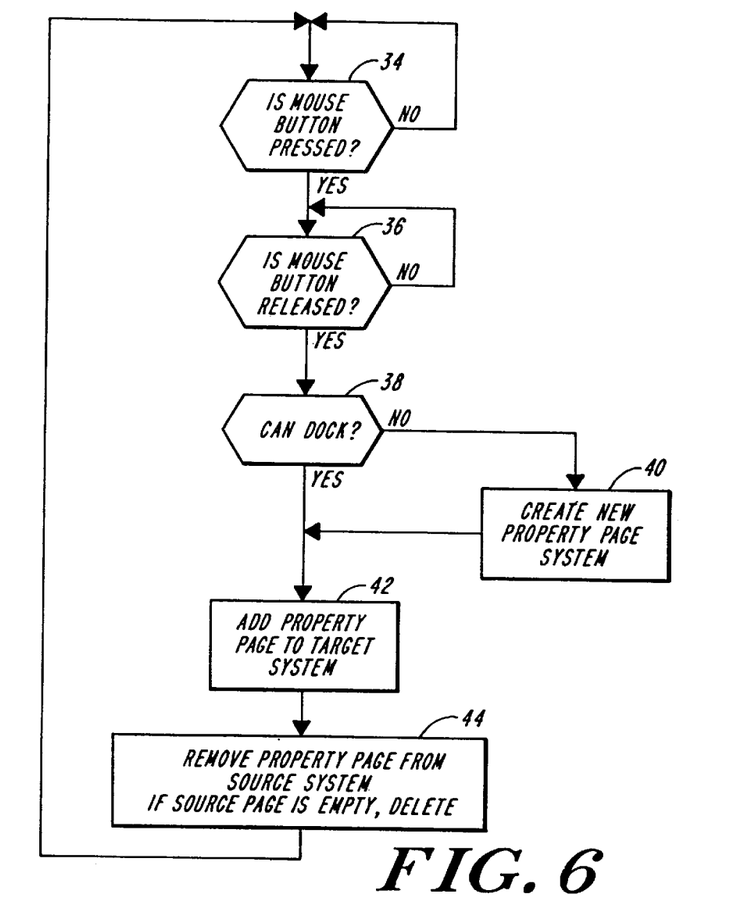
FIG. 6 is a flow chart diagram illustrating the steps involved in removing a property page from a property sheet system and placing it in a second property sheet system, as depicted in FIGS. 2–4.

The invention uses the logic depicted in the operational flow chart illustrated in FIG. 6. Starting at decision box 34, pressing a mouse key when the cursor is within a property page "tears" the property page and leads along the "yes"

branch of box 34 to box 36. As the mouse is dragged, that is, moved with the mouse button pressed, an outline of the property page is drawn on the screen. This process will continue until the user releases the mouse button. Releasing the mouse button leads from along the "yes" branch of box 36 to decision box 38, which determines whether the torn property page can be docked, that is, whether the drag box 20 is positioned over a property page of an existing property sheet system. If docking is possible, the torn page is docked into the "target" system, as in box 42; if the page cannot be docked, a new property sheet system is created for inclusion of the torn property page, as indicated by box 40. Finally, in box 44, the torn page is removed from the original property sheet system, and if no other pages remain in the original, or source, property sheet system, the system is deleted, or destroyed. In the remainder of the specification, the object classes and coding to perform the above-described operations are described.

The present invention uses techniques of object-oriented programming. In object-oriented programming, routines are separate entities that include both data and functions, or methods, for processing the data. Object-oriented programming differs from traditional structured programming, which relied heavily on subroutines, and in which data and the routines that handled the data were usually strictly segregated. Structural programming is organized in terms of computer details, such as files, record, and sorting algorithms; object oriented programming is organized in terms of the physical entities, the "objects, " that exist in the environment in which the problem is to be solved. The data and methods stored in a object represent, respectively, the attributes of the physical object and the actions a object is capable of carrying out. Objects are related to classes; an object is said to be an instance of a class. A class is not an object, but a template that instructs a compiler how to construct an actual object.

Those of ordinary skill in the art of modem programming are familiar with object-oriented concepts such as encapsulation, inheritance and polymorphism. Encapsulation refers to combining data and functions, or methods, that process the data into a single object, wherein the internal details of the methods and data may be largely hidden. Inheritance refers to a derived class inheriting the features and capabilities of the base, or parent, class. The derived class can then be modified to suit a particular need. Polymorphism allows objects whose properties differ to be able to function together. That is, the interfaces through which objects exchange messages are standardized and not dependent on the exact internal working of an object. Because of encapsulation, polymorphism and inheritance, object oriented-programming is a modular approach that reduces the amount of coding a designer of a new system or function needs to perform. Objects can be joined in a coherent procedure in which objects can be added, modified or deleted without a designer having to rewrite a whole application. A considerable amount of code written by others is reusable, and is often reused. For example, the Microsoft Foundation Class (MFC) Library is a set of more than 100 classes designed to help C++ programmers write Windows-based programs. The present invention built upon classes from the MFC version 4.1 library.

Accordingly, described herein are only those class definitions, and code segments, necessary for one of ordinary skill in the relevant programming arts, possessed of all the teachings herein, to make and use the invention. Classes, objects and codes well known to, or easily created by, those of ordinary skill in the art, or available in published libraries, such as MFC library, are not described, or if described, are only briefly discussed.

The present invention provides for a sophisticated property sheet system that supports modeless operation and tear-away property pages. The system uses the standard system software components illustrated in FIG. 7. The components include the application frame window 46 and the property sheet system 48. In general, property sheet systems are implemented using three components: a property frame 48A, a property sheet 48B, and one or many property pages 48C. These three components 48A–48C are related. The property pages 48C are the children of the property sheet 48B; the property sheet 48B is the child of the property frame 48A; and the property system 48 is owned by the application's main frame window 46. Because the property frame 48A is typically a top-level window, it generally cannot be a child of another window, but it can be owned.

Figure 7:
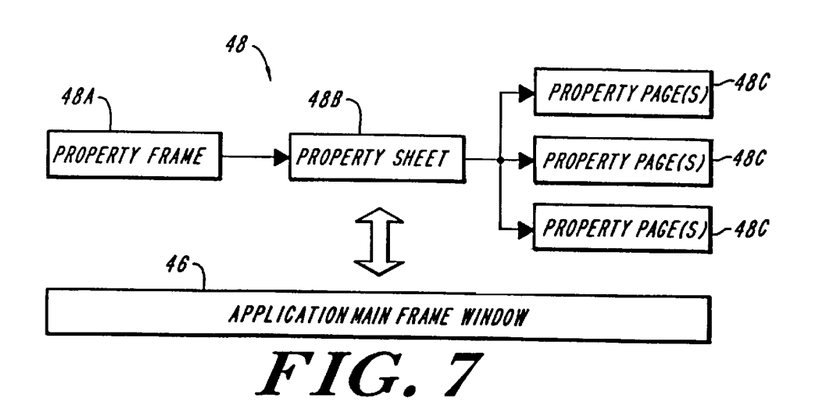
FIG. 7 is a schematic illustration block diagram of the software components utilized in accordance with the teachings of the present invention.

The present invention extends the standard property sheet system, such as that in FIG. 7, by extending the standard classes to allow the tearing of property pages, the creation of new property sheet systems, and the docking of torn property pages into existing property sheet systems. The classes are illustrated in FIG. 8.

Figure 8:
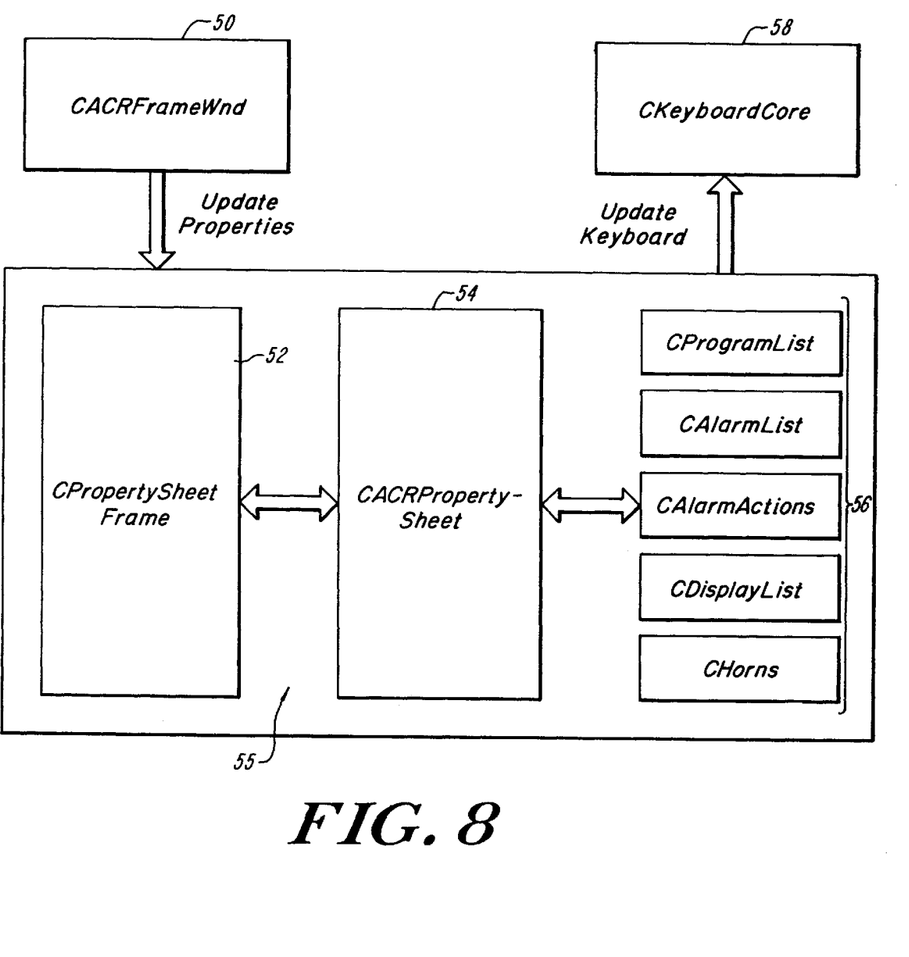
FIG. 8 illustrates the object classes, and their relationships, in accordance with the teachings of the present invention.

The application frame window class 50, labeled CACRFrameWnd in FIG. 8, provides management support for the property sheet system 55. The application frame window class 50 provides property page dock support, property page availability handling, and property sheet system creation. The application frame window 50 constructs the property sheet system 55 with a creation mask that indicates which property pages 56 to create. Additionally, the application frame window 50 provides the notification interface used by the property sheet system 55 when property or selection information has changed in a property page 36.

The property sheet system 55 is comprised of three distinct parts. The first and least significant of these components is the property sheet frame class 52. The property sheet frame 52 is a mini-frame window that is used to house the property sheet system 55 window. The property sheet frame 52 allows the property sheet system 55 window and pages 56 to be operated in an modeless fashion. The property sheet frame 52 creates the property sheet 54, hides itself when closed, and provides access methods to its owned property sheet 54.

The property sheet class 54 provides management support for the key property pages 56. This support includes property page creation, property page docking support, and property page update facilities.

The individual property pages 56 constitute the final component of the property sheet system 55. Each property page 56 provides specific edit functions for a portion of the data exchanged with an application program. Each property page is derived from a base property page that provides application-specific property page functions. The base property page provides tear-away page support, and facilities to update a keyboard or be updated from a keyboard. The base property page also provides an iterative mechanism for setting property information for multiple keys of keypad annunciator 16 in FIG. 2 to facilitate disabling of controls.

Further elaboration is provided below, in a separate section on each of the components. Class definitions and a description of the instance variables and methods for the property frame class, property sheet class, and property page classes are provided. Important code sections for the property sheet and property page classes are listed at the end of the specification, and additional code, including code pertaining to modification of the application frame window class is provided in an appendix. Coding for the property sheet frame class is not provided.

Application Frame Window Class

Coding for portions of the application frame window class is provided in the appendix.

Property Sheet Frame Class—
CPropertySheetFrame:CMiniFrameWnd

The property sheet frame 52 allows the property sheet system window and pages to be operated in a modeless fashion. The property sheet frame 52 can operate to create the property sheet, to hide itself when closed, and provides access methods to its owned property sheet.

Figure 9A:
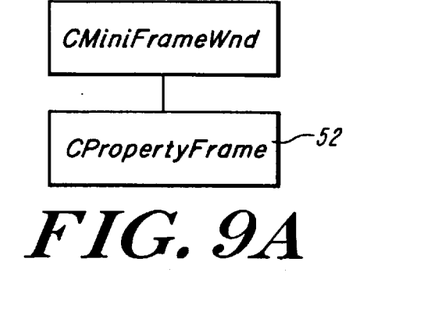
FIGS. 9A–9C illustrate parent-child relationships of particular object classes depicted in FIG. 8 and used in the software coding according to the teachings of the invention.

As shown in FIG. 8 and in FIG. 9A, the CPropertySheet-Frame 52 provides the harness window for the property sheet system. The CPropertySheetFrame 52 creates, destroys, manages visibility, and facilities modeless operation of the property sheet system.
The CPropertySheetFrame class 52 is defined below in Tables 1 and 2.

Methods

CPropertySheetFrame(UINT wCreatePageMask): This method is the constructor for the CPropertySheetFrame class. The constructor will store the specified page creation mask internally and use it later during the creation process. The constructor will initialize the m_pACRPropertySheet member variable to NULL.

~CPropertySheetFrame(): This method is the destructor for the CPropertySheetFrame class. The destructor will destroy the m_ACRPropertySheet member variable.

GetPropertySheet(): This method returns the m_ACRPropertySheet pointer.

OnCreate(LPCREATESTRUCT lpCreateStruct): This method handles the creation of the frame window. This class customizes the creation process by creating the property sheet system at this time. The property sheet system is created with the page create mask, m_wCreatePageMask, that was specified during class creation.

OnClose(): This is a method that intercepts the normal window close behavior. The default behavior of the close process is to destroy the window and this class. This method simply hides the window. The destruction of this class is the responsibility of the CACRFrameWindow.

TABLE 1

CPropertySheetFrame Class Definition

| Name | Parameters | Returns | Access | Virtual |
|---|---|---|---|---|
| CPropertySheetFrame | UINT wCReatePageMask | Nothing | public | no |
| ~CPropertySheetFrame | void | Nothing | public | yes |
| GetPropertySheet | void | CACRPropertySheet* | public | no |
| OnCreate | LPCREATESTRUCT lpCreateStruct | int | protected | no |
| OnClose | void | void | protected | no |
| OnSetFocus | CWnd* pOldWnd | void | protected | no |
| OnActivate | UINT nState, CWnd* pWndOther, BOOL bMinimized | void | protected | no |

TABLE 2

CPropertySheetFrame Data Definition

| Name | Type | Access |
|---|---|---|
| m_pACRropertySheet | CACRPropertySheet* | private |
| m_wCreatePageMask | UINT | private |

Below is a description of the data and methods of the CPropertySheetFrame 52.

Data m_pACRPropertySheet: This data member is a pointer to the property sheet system that is created and managed by this frame.

m_wCreatePageMask: This a data member s the initial page creation mask used to define this property sheet system. The page creation mask is a bit field that indicates to the property sheet system which property pages to create.

OnSetFocus(CWnd* pOldWnd): This is a method that forwards the focus handling to the embedded property sheet system if one is defined.

OnActivate(UINT nState, CWnd* pWndOther, BOOL bMinimized): This is a method that forwards the activation handling to the embedded property sheet system if one is defined.

Property Sheet Class—
CACRPropertySheet:CPropertySheet

Figure 9B:
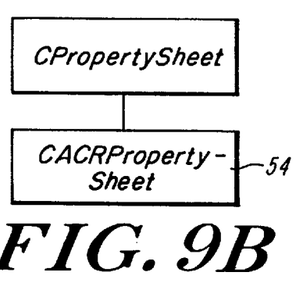

The CACRPropertySheet 54, illustrated in FIGS. 8 and 9B, provides support for the key property pages. CACR-PropertySheet customizes the default property sheet behavior by providing automatic property page creation, property page docking support, and property page update facilities. The CACRPropertySheet class 54 is defined below in Tables 3 and 4.

TABLE 3

CACRPropertySheet Class Definition

| Name | Parameters | Returns | Access | Virtual |
|---|---|---|---|---|
| CACRPropertySheet | CWnd* pWndParent, UINT wPageCreateFlag | Nothing | public | no |
| ~CACRPropertySheet | void | Nothing | public | yes |
| OnCreate | LPCREATSTRUCT lPCreateStruct | int | protected | no |
| CreatPage | UINT wPageMask | void | public | no |
| PostNeDestroy | void | void | public | no |
| DestroyPage | UINT wPageMask | void | public | no |
| IsPageEnabled | UINT wPageMask | BOOL | public | no |
| GetPageMask | void | UINT | public | no |
| FindPage | UINT wPAgeMask | CPropertyPage* | public | no |
| TearOffPage | UINT wPageMask, LRECT pTearOffRect | void | public | no |
| UpdatePageControl | void | void | public | no |

TABLE 4

CACRPropertySheet Type Definitions

| Mask | Value |
|---|---|
| NO_PAGES | 0x00000000 |
| PAGES_ACTIONS | 0x00000001 |
| PAGE_DISPLAYS | 0x00000002 |
| PAGE_PROGRAMS | 0x00000004 |
| PAGE_COMMANDS | 0x00000008 |
| PAGE_ALARM_LIST | 0x00000010 |
| PAGE_ALARM_COLOR | 0x00000020 |
| LEGAL_PAGES_ONLY | 0x0000003f |
| ALL_AVAILABLE_PAGES | 0xffffffff |

Masks

The following masks are used to define property pages that are used in the CACRProperySheet implementation.

NO_PAGES: Specifies no pages.

PAGE_ACTIONS: Specifies the Alarm Actions Property Page.

PAGES_DISPLAYS: Specifies the Display Property Page.

PAGE_PROGRAMS: Specifies the Program Property Page.

PAGE_COMMANDS: Specifies the Command Property Page.

PAGE_ALARM_LIST: Specifies the Alarm List Property Page.

PAGE_ALARM_COLOR: Specifies the Color Property Page.

LEGAL_PAGES_ONLY: Specifies all the legal Property Pages.

ALL_AVAILABLE_PAGES: Specifies all pages, legal or otherwise.

Methods

CACRPropertySheet(CWnd* pWndParent, UINT wPageCreateFlag): This is the constructor for the property sheet system. The constructor will invoke the CreatePage member with the specified page create mask.

~CACRPropertySheetO This is the destructor for CACRPropertySheet. The destructor will delete all ed property pages.

OnCreate(LPCREATESTRUCT lpCreateStruct): The OnCreate handler automatically snaps this window to the client region of its parent, typically the CPropertySheetFrame.

PostNcDestroy(): This method calls the default PostNcDestroy handler and then deletes itself.

CreatePage(UINT wPageMask): This method will creates the property pages specified by the page mask. All created property pages are automatically added to this property sheet.

DestroyPage(UINT wPageMask): This method will find the page with the specified mask, remove it from the property sheet system, and destroy it. The page mask must specify a single page for this method.

IsPageEnabled(UINT wPageMask): This method will determine it the page specified by the page mask is present in this property sheet system. This method will return TRUE if the page is found, FALSE otherwise.

GetPageMask(void): This method will return the page mask for all the pages ed in this property sheet system.

FindPage(JINT wPageMask): This method will find the page specified by the page mask. This method will return the specified page if it is found, NULL otherwise.

TearOffPage(UINT wPageMask): This method will request the main frame window to create a property sheet system in the specified page mask, remove the specified page from the property sheet system, and if the property page removed is the last on kill this class.

UpdatePageControl(void): This method provides a work around to a MFC 3.0 bug concerning the automatic redraw of the page control used in the property sheet system.

Property Page—CACRPropertyPage:
CPropertyPage

Figure 9C:
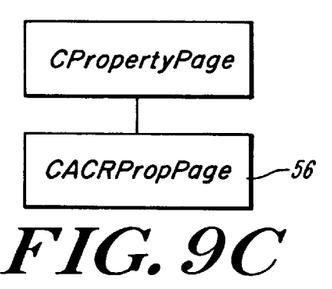

The CACRPropertyPage 56, as illustrated in FIGS. 8 and 9C, provides the core behavior for the key property sheet system for the process control application program. The key property sheet system is used to configure the keys, of the keypad annunciator 16 in FIG. 2. CACRPropertyPage 56 provides tear-away page support and facilitates setting of properties from and to a target data source.

The CACRPropertyPage class is defined below in Tables 5 and 6.

TABLE 5

CACRPropertyPage Class Definition

| Name | Parameters | Returns | Access | Virtual |
|---|---|---|---|---|
| CACRPropertyPage | UINT wPageID, UINT nIDTemplate, UINT nIDCaption | Nothing | public | no |
| CACRPropertyPage | LPCSTR lpszTemplateName, UINT nIDCaption | Nothing | public | no |
| ~CACRPropertyPage | void | Nothing | public | yes |
| GetPageID | void | UINT | public | no |
| BeginPropertySet | void | void | public | yes |
| EndPropertySet | void | void | public | yes |
| GetPropertySheet | void | CACRPropertySheet | public | no |
| ClipRectToWindow | HWND hWnd, LPRECT pRECT | void | protected | no |
| Track | HDC hDC, LPRECT pTrackRect, BOOL bKillTrack | void | protected | no |
| TearOffDialog | LPRECT pTearOffRect | void | protected | no |
| OnLButtonDown | UINT nFlags, CPoint point | void | protected | no |
| OnLButtonUp | UINT nFlags, CPoint point | void | protected | no |
| OnMouseMove | UINT nFlags, CPoint point | void | protected | no |

TABLE 6

CACRPropertyPage Data Definition

| Name | Type | Access |
|---|---|---|
| m_rTrackRect | RECT | protected |
| m_bIsTracking | BOOL | protected |
| m_bIsTearable | BOOL | protected |
| m_bDitherLast | BOOL | protected |
| m_sizeLast | SIZE | protected |
| m_rectLast | RECT | protected |
| m_ptStartPoint | POINT | protected |
| m_wPageID | UINT | protected |

Data m_rTrackRect: This variable s the property page tracking rectangle during a page tear operation.

m_bIsTracking: This variable indicates that the property page is in the process of being torn off.

m_bIsTearable: This variable indicates that the current property page is tearable.

m_bDitherLast: This variable indicates the state of the last drag track render operation. To maximize visibility the track rectangle is rendered in a combination of dithered states and non-dithered states.

m_sizeLast: This variable s the size of the last track render operation.

m_rectLast: This variable s the rectangle that was previously rendered during the drag operation.

m_dtStartPoint: This variable s the starting point of the drag operation. The start point will maintain the relative position of the drag rectangle to the mouse.

m_wPageID: This variable s the page id of this property page. The page id is defined on creation of the property page.

Methods

CACRPropertyPage(UINT wPageID,UINT nIDTemplate,UINT nIDCaption): This is the constructor for the CACRPropertyPage dialog. The constructor requires specification of the page ID, a dialog template, and a caption.

CACRPropertyPage(UINT wPageID ,LPCSTR lpszTemplateName,UINT nIDCaption): This is a constructor for the CACRPropertyPage dialog. This version of the constructor allows for the specification of the template using a string.

~CACRPropertyPage(): This is the destructor for the CACRPropertyPage class.

GetPageID(void): This method returns the m_PageID member variable.

BeginPropertySet(void): This method provides a hook for derived property page classes to initialize data state information to properly reflect data values under multiple keys.

EndPropertySet(void): This method provides a hook for derived property pages to end the property setting process by reflecting collected state information into the property page controls.

GetPropertySheet(void): This method returns the parent property sheet. This method will ASSERT if the parent property sheet is not of CACRPropertySheet style.

ClipRectToWindow(HWND hWnd,LPRECT pRect): This method will clip the specified rectangle to the specified window. The method will maintain the size of the specified rectangle if possible.

Track(HDC hDC,LPRECT pTrackRect,BOOL bKillTrack=FALSE): This method performs tracking for the property page drag/tear operation.

TearOffDialog(LPRECT pTearOffRect): This method performs the property page tear operation. It determines it the specified rectangle represents a tearable state and if so performs the tear operation.

OnLButtonDown(UINT nFlags, CPoint point): This method handles the left mouse button down processing. This method will start the property page tear operation.

OnLButtonUp(UINT nFlags, CPoint point): This method handles the left mouse button up processing. This method will end the property page tear operation.

OnMouseMove(UINT nFlags, CPoint point): This method handles mouse move processing. This method will drag the page tear rectangle if the mouse button is pressed and the page tear operation is underway.

Key Prolerty Pages

Figure 10:
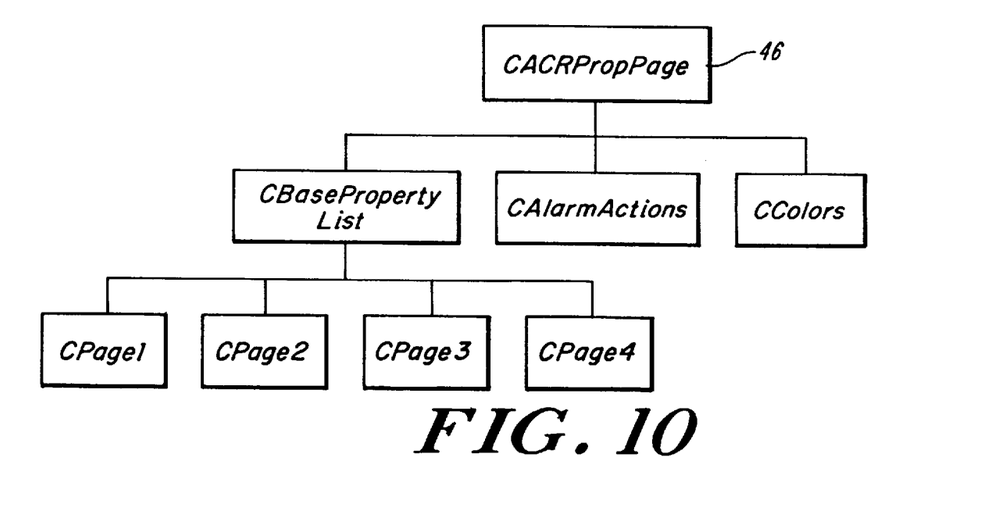
FIG. 10 is a hierarchical schematic illustrating the derivation of key property pages from a property page base class according to the teachings of the present invention.

In the application described here, wherein the property pages are used to exchange information about, and to configure, the keys of keypad annunciator 16 in FIG. 2, the key property pages are derived from the CACRPropertyPage base class, as shown in FIG. 10. The property pages provide specific edit operations for the key data.

Each property page will be implemented in a similar fashion. In general, each property page will provide the following interface, as set forth in Table 7.

TABLE 7

CACRGenericEditPage Class Definition

| Name | Parameters | Returns | Access | Virtual |
|---|---|---|---|---|
| CACRGenericEditPage | UINT wPageID, UINT nIDTemplate, UINT nIDCaption | Nothing | public | no |
| CACRGenericEditPage | LPCSTR lpszTemplateName, UINT nIDCaption | Nothing | public | no |
| ~CACRGenericEditPage | void | Nothing | public | yes |
| BeginPropertySet | void | void | public | yes |
| EndPropertySet | void | void | public | yes |

Code sections for the property sheet and property page classes, as well as code sections pertaining to modification of the application frame window class, are provided in an appendix. The code is written in the C++ programming language, but can be used as the operational foundation for other implementations.

I claim:

1. A computerized data processing apparatus, comprising
processor means for executing a program,
a memory element for storing the program,
a display monitor for providing a display,
selection means for selecting a property page of a first property sheet system, the first property sheet system including at least one property page displayable at a first position on the display monitor, and
creation means for creating a second property sheet system including said selected property page, said selected property page being displayable at a second display position on the display monitor.

2. The data processing apparatus of claim 1 further including
removal means for removing said property page selected by said selection means from said first property sheet system such that said selected property page is not displayable by said first property sheet system.

3. The data processing apparatus of claim 2 further including
destruction means for destroying said first property sheet system when said first property sheet system does not include any property pages.

4. The data processing apparatus of claim 1 further comprising
positioning means for varying and indicating on the display monitor said second display position at which said property page selected by said selection means and included in said second property sheet system is displayable by said second property sheet system.

5. The data processing apparatus of claim 1 further including
docking means for placing said property page selected by said selection means into a selected property sheet system for inclusion therein, said property page being displayable on the display monitor by said selected property sheet system.

6. The data processing apparatus of claim 5 further comprising
positioning means for varying and indicating the position on the display monitor of a symbol representative of a property page selected by said selection means, and
proximity means for determining a parameter responsive to the distance on the display monitor between said symbol and the position on the display monitor of a displayed property page of a property sheet system, and wherein when said parameter is less than a first selected value, said docking means in response to a first user input places said selected property page in said property sheet system displaying said displayed property page for inclusion therein and for display on the display monitor thereby.

7. The data processing apparatus of claim 6 wherein when said parameter is greater than a second selected value, said creation means in response to a second user input displays said selected property page included in said second property sheet system at a position on the display monitor determined by the display position of said symbol.

8. The data processing apparatus of claim 7 further comprising
a pointing and selecting user input means including a user-depressable key for providing user input to said docking and creation means, said first and second user inputs being provided to said docking and creation means by depression of said key.

9. The data processing apparatus of claim 6 further comprising
icon means for displaying on the display monitor an icon having at least a first display state, said icon being displayed in said first display state when said parameter is less than said first selected value, said first display state indicating to a user that said docking means, in response to said first user input, places said selected property page into said property sheet system displaying said displayed property page.

10. The data processing apparatus of claim 9 wherein said icon means further comprises means for displaying said icon in a second display state when said parameter is greater than a second selected amount, said second display state indicating to a user that said second property sheet system displays said property page selected by said selection means at a position on the display monitor determined by the position of said symbol.

11. A machine readable data storage medium comprising
means for selecting a property page, displayable at a first display position on a display monitor, of a first property sheet system, and means for creating a second property sheet system including said selected property page, said selected property page being displayable on a display monitor at a second display position on the display monitor.

12. A machine readable data storage medium according to claim 11 including means for removing said selected property page said first property sheet system such that said selected property page is not displayable by said first property sheet system.

13. A machine readable data storage medium according to claim 12 including means for destroying said first property sheet system when said first property sheet system does not include any property pages.

14. A machine readable data storage medium according to claim 11 comprising means for varying and indicating on the display monitor said second display position at which said property page selected by said selection means and included in said second property sheet system is displayable by said second property sheet system.

15. A machine readable data storage medium according to claim 11 comprising means for docking said property page selected by said selection means into a selected property sheet system for inclusion therein, said property page being displayable on the display monitor by said selected property sheet system.

16. A machine readable data storage medium according to claim 15 comprising means for varying and indicating the position on the display monitor of a symbol representative of a property page selected by said selection means, and, means for determining a parameter responsive to the distance on the display monitor between said symbol and the position on the display monitor of a displayed property page of a property sheet system, and wherein when said parameter is less than a first selected value, said means for docking, in response to a first user input, places said selected property page in said property sheet system displaying said displayed property page for inclusion therein and for display on the display monitor thereby.

17. A machine readable data storage medium according to claim 16 wherein when said parameter is greater than a second selected value, said means for creating, in response to a second user input, displays said selected property page included in said second property sheet system at a position on the display monitor determined by the display position of said symbol.

18. A machine readable data storage medium according to claim 17 comprising means responsive to a pointing and selecting user input device, wherein said device includes a user-depressable key for providing user input to said means for docking and to said means for creating, said responsive means, upon depression of said key, providing first and second user inputs to said means for docking and to said means for creating.

19. A machine readable data storage medium according to claim 16 comprising means for displaying on the display monitor an icon having at least a first display state, said icon being displayed in said first display state when said parameter is less than said first selected value, said first display state indicating to a user that said means for docking, in response to said first user input, places said selected property page into said property sheet system displaying said displayed property page.

20. A machine readable data storage medium according to claim 19 wherein said means for displaying an icon further comprises means for displaying said icon in a second display state when said parameter is greater than a second selected amount, said second display state indicating to a user that said second property sheet system displays said property page selected by said means for selecting at a position on the display monitor determined by the position of said symbol.

21. A computerized method for displaying property pages on a display monitor, comprising the steps of creating a first property sheet system including at least one property page displayable at a first position on a display monitor, selecting a property page of said first property sheet system, and creating a second property sheet system including said selected property page, said selected property page being displayable at a second display position on the display monitor.

22. The method of claim 21, further comprising the step of removing said selected property page from said first property sheet system such that said selected property page is not displayable by said first property sheet system.

23. The method of claim 22, further comprising the step of destroying said first property sheet system when said first property sheet system does not include any property pages.

24. The method of claim 21, further comprising the step of displaying said second display position on the display monitor.

25. The method of claim 24, further comprising the step of displaying said selected property page by said second property sheet system.

26. The method of claim 21, further comprising the step of placing said selected property page into a selected property sheet system for inclusion therein, said property page being displayable on the display monitor by said selected property sheet system.

27. The method of claim 26, further comprising the steps of indicating the position on the display monitor of a symbol representative of a property page, and determining a parameter responsive to the distance on the display monitor between said symbol and the position on the display monitor of a displayed property page of a property sheet system, wherein when said parameter is less than a first selected value, said placing step disposes said selected property page in said property sheet system displaying said displayed property page for inclusion therein for display on the display monitor, in response to a first user input.

28. The method of claim 27, further comprising the step of determining when said parameter is greater than a second selected value, wherein said creating step in response to a second user input displays said selected property page included in said second property sheet system at a position on the display monitor determined by the display position of said symbol.

29. The method of claim 28, further comprising the step of providing user input by depression of a user-depressable key.

30. The method of claim 27, further comprising the step of displaying on the display monitor an icon having at least a first display state, said icon being displayed in said first display state when said parameter is less than said first selected value, said first display state indicating to a user that said placing step, in response to said first user input, places said selected property page into said property sheet system displaying said displayed property page.

31. The method of claim 30, further comprising the step of displaying said icon in a second display state when said parameter is greater than a second selected amount, said second display state indicating to a user that said second property sheet system displays said property page selected by said selection means at a position on the display monitor determined by the position of said symbol.

32. A computerized data processing apparatus, comprising a processor for executing a program, a memory element for storing the program, a display monitor for providing a display, a selection module for selecting a property page of a first property sheet system, the first property sheet system including at least one property page displayable at a first position on the display monitor, and a creation module for creating a second property sheet system including said selected property page, said selected property page being displayable at a second display position on the display monitor.

33. The data processing apparatus of claim 1, further comprising destruction means for destroying said first property sheet system when said first property sheet system does not include any property pages.

* * * * *